Dec. 20, 1966 P. E. DOHERTY 3,293,331

METHOD OF FORMING REPLICAS OF CONTOURED SUBSTRATES

Filed Nov. 13, 1962

INVENTOR.
Paul E. Doherty

BY [signature]
Attorney

United States Patent Office 3,293,331
Patented Dec. 20, 1966

3,293,331
METHOD OF FORMING REPLICAS OF CONTOURED SUBSTRATES

Paul E. Doherty, Arlington, Mass., assignor to Arthur D. Little, Inc., Cambridge, Mass., a corporation of Massachusetts Filed Nov. 13, 1962, Ser. No. 236,921
6 Claims. (Cl. 264—1)

This invention relates to forming replicas of contoured surfaces and more particularly to forming improved replicas of corrugated substrates.

It is often desirable to be able to make replicas of contoured surfaces, the replicas being later used in the formation of duplicate substrates or in the form of thin film replicas which reproduce the surface of the master substrate. Although this invention is not limited to any one application for such replicas, the making of replicas to form optical tools may be taken as an example of the advantages to be gained in the process described herein.

It has been shown in the literature (Journal of the Optical Society of America, vol. 50, 886–891) that it is possible to make thin wire grids which can be used as polarizers by making replicas of a corrugated substrate and then subsequently shadowing the ridges of the corrugation with an appropriate material to form thin wires evenly spaced. The shadowing technique to form wire grids in which very fine wires are placed extremely close together is used in a process described in a co-pending application, Serial No. 210,347, now Patent No. 3,235,630, filed in the names of Paul E. Doherty, Henry H. Blau, Jr., and Richard S. Davis, and assigned to the same assignee as the present application. Basically, the process of the invention described in the above-identified application comprises the steps of electropolishing the surface of a single aluminum crystal to form periodical corrugations made up of recurring valleys and peaks, forming a replica of this corrugated surface and finally shadowing the peaks of the replica to form a gridwork comprising a series of very fine lines closely spaced.

In forming a corrugated substrate, whether by ruling or by any other means such as that described in the above-identified patent application, difficulties are encountered in obtaining sufficient height of the peaks with respect to the position of the corresponding valleys. That is, it is difficult to accentuate corrugations through shadowing of the replica alone. The process of this invention teaches a way in which this difficulty can be overcome.

It is, therefore, a primary object of this invention to provide an improved process for making replicas which will be suitable for subsequent shadowing and which have the corrugations materially accentuated. It is an additional object of this invention to provide replicas of the character described which can serve as the basis for making optical tools such as diffraction gratings and polarizers. Other objects of the invention will in part be obvious and will in part be apparent hereinafter.

The invention accordingly comprises the several steps and the relation of one or more of such steps, with respect to each of the others thereof, which will be exemplified in the method hereinafter disclosed, and the scope of the invention will be indicated in the claims.

For a fuller understanding of the nature and objects of this invention, reference should be had to the following detailed description taken in connection with the accompanying drawings in which FIGS. 1 and 2 are cross-sectional representations (much enlarged and not to scale) of two typical corrugated substrates which have been shadowed;

In the description which follows, the term "corrugated substrate" is used to describe any substrate which has a surface formed of periodically recurring peaks and valleys; whether formed by mechanical means, such as ruling, or by chemical means such as described in Serial No. 210,347. The peaks may be sharp as in FIG. 1 or they may be rounded as in FIG. 2.

By the process of this invention the ridges of the corrugated substrate are shadowed prior to the formation of the replica such that the replica represents the configuration of the shadowed master substrate. Such a replica may be subsequently shadowed to form a diffraction grating or polarizer. The process may be repeated using each shadowed replica as a master surface to form a subsequent replica in which the corrugations are further accentuated.

Figure 1:
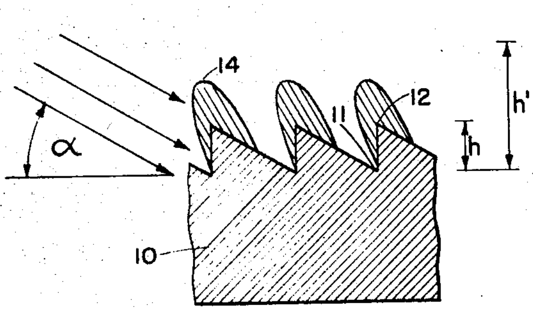
Figure 2:
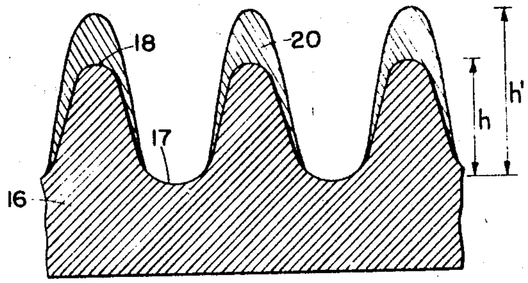

FIGS. 1 and 2 are much enlarged, cross-sectional representations (not to scale) of a fragmentary portion of two types of corrugated surfaces. FIG. 1 may be considered to represent a typical ruled grating while FIG. 2 represents a corrugated surface formed by the method described in Serial No. 210,347. In FIG. 1 the corrugated substrate 10 will be seen to have periodically recurring valleys 11 and peaks 12. The difference in height between the valleys and peaks is represented as height $h$. In a similar fashion, FIG. 2 shows another corrugated substrate 16 having recurring valleys 17 and peaks 18 which define its corrugated surface. Likewise, the difference in height between the valleys and peaks is represented by $h$. By shadowing these corrugated substrates, it is possible to deposit on them continuous strips or wires 14 and 20, along the ridges of the corrugations, thus increasing the height $h$ to $h'$ which includes the added height of the wires 14 (FIG. 1) and 20 (FIG. 2) deposited by shadowing.

The shadowing step is most conveniently carried out by placing the substrate in an evacuated atmosphere and depositing a material on the ridges of the peaks from the vapor phase. In doing this it is necessary to direct the vapor at the substrate at a small angle $\alpha$. Ideally, what is desired is a continuous wire of the material lying as nearly as possible on the ridge of each peak and being as high as possible without exhibiting any substantial increase in width. The angle $\alpha$ shown in FIG. 1, which is that made between the horizontal plane of the peaks and the direction of the vapor, should be of the order of 5°–20°. Shadowing is continued only to the extent that the peaks are built up to the required additional height.

Inasmuch as the shadowing is done at this point of the process only for the purpose of accentuating the peak height the material used in shadowing may be any suitable material which can be vaporized and which can be deposited from the vapor phase in a thin, continuous, relatively smooth wire or strip. Normally, the shadowing material will be a metal inasmuch as the technique for depositing metals in the form desired is well developed. Such metals include, but are not limited to, aluminum, lead and silver. However, nonmetallic materials which can be deposited from the vapor phase may of course also be used. For example, metal oxides, e.g. SiO, may be employed.

Figure 3:
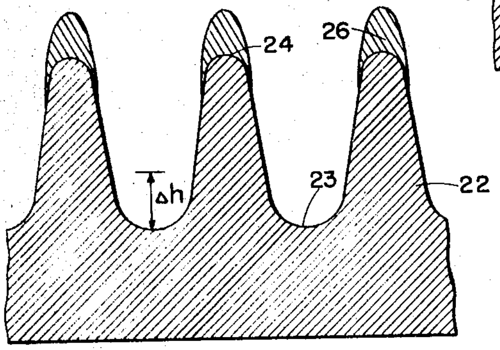
FIG. 3 is a cross-sectional representation of a replica formed in accordance with this invention.

In FIG. 3 a replica 22 is shown which has been formed from the master substrate of FIG. 2. This, of course, consists of the original substrate 16 plus the strips 20 deposited by shadowing. Such replicas are conveniently made by coating the master substrate surface with a solution of a suitable plastic material, such as nitrocellulose, removing the solvent, and stripping the replica from the master substrate. Such a replica may of course be a relatively massive structure or it may be a thin film, depending upon the ultimate use of the replica. In FIG. 3 it can be seen that the replica has a surface the corrugations of which are now formed by valleys 23 and peaks 24. In order to form a fine wire grid using the replica 22, it is necessary to shadow the peaks of the replica to form thin continuous fine wires 26. If, for example, the replica is in the form of a thin film and the finished grid is to be used as a polarizer, the peaks will be shadowed with an electrically conducting metal.

Figure 4:
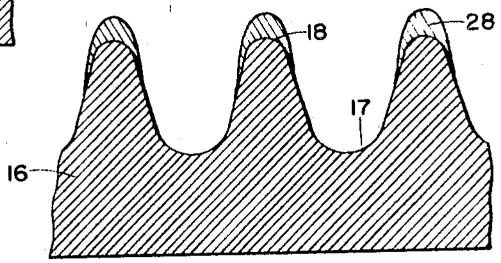
FIG. 4 is a cross-sectional view of a comparable replica formed in accordance with prior art techniques.

FIG. 4 represents a replica prepared as described above using the original substrate 16 of FIG. 2 for its formation rather than the modified substrate from which the replica of FIG. 3 was made. The difference in height of the corrugations of the replica surface of FIG. 3 and FIG. 4 is indicated by $\Delta h$. This difference represents that height gained by the shadowing of the master substrates 10 or 16 prior to forming the replica. The actual increase in height $\Delta h$ will depend upon the amount of shadowing and upon the original geometry of the substrate surface being replicated.

Figure 5:
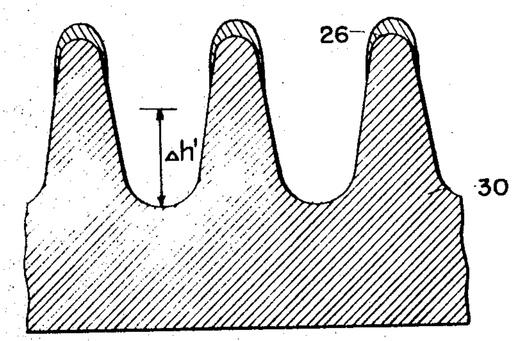
FIG. 5 is a cross-sectional view of a replica formed using the replica of FIG. 3 as a master corrugated substrate.

It is of course possible to repeat the process of shadowing by using a shadowed replica, such as that shown in FIG. 3 as a new master substrate for forming a second replica thus increasing $\Delta h$ to $\Delta h'$. Such a shadowed substrate is shown in FIG. 5 wherein the replica 30 was formed using the shadowed replica of FIG. 3 as a master substrate.

The advantages of being able to build up the peak heights on a replica prior to shadowing to form a fine wire grid are readily apparent. Primary among these is that the replicas formed can subsequently be shadowed without depositing any undesirable amount of the shadowing material in the valleys of the replica surface.

It will thus be seen that the objects set forth above, among those made apparent from the preceding description are efficiently attained and, since certain changes may be made in carrying out the above method without departing from the scope of the invention, it is intended that all matter contained in the above description shall be interpreted as illustrative and not in a limiting sense.

I claim:

1. Method of increasing the height of the peaks of a replica formed from a corrugated substrate consisting of periodically recurring peaks and valleys, characterized by the step of shadowing the ridges of said peaks prior to the formation of said replica.

2. Method in accordance with claim 1 wherein said shadowing comprises depositing a material from the vapor phase onto the ridges of said peaks.

3. Method in accordance with claim 1 wherein said substrate is a ruled grating.

4. Method in accordance with claim 1 wherein said substrate is formed by electropolishing the surface of a single aluminum crystal.

5. Method for increasing the height of the peaks of a replica formed from a corrugated substrate consisting of periodically recurring peaks and valleys, comprising the steps of shadowing the ridges of the peaks of said substrate forming a first replica of the resulting shadowed substrate, shadowing the ridges of the peaks of said first replica, and forming a second replica of said first shadowed replica.

6. Method of forming an optical tool, comprising the steps of shadowing the ridges of the peaks of a corrugated substrate made up of periodically recurring peaks and valleys, forming a replica of the surface of said substrate, and shadowing the ridges of the peaks of said replica.

References Cited by the Examiner

UNITED STATES PATENTS

| | | | |
|---|---|---|---|
| 2,232,551 | 2/1941 | Merton | 264—1 |
| 2,464,738 | 3/1949 | White et al. | 264—1 |
| 3,235,630 | 2/1966 | Doherty et al. | 264—1 |

ROBERT F. WHITE, *Primary Examiner.*

B. SNYDER, *Assistant Examiner.*